April 2, 1935.  L. W. BOWEN  1,996,054
PROJECTION LENS SYSTEM
Filed Aug. 19, 1933
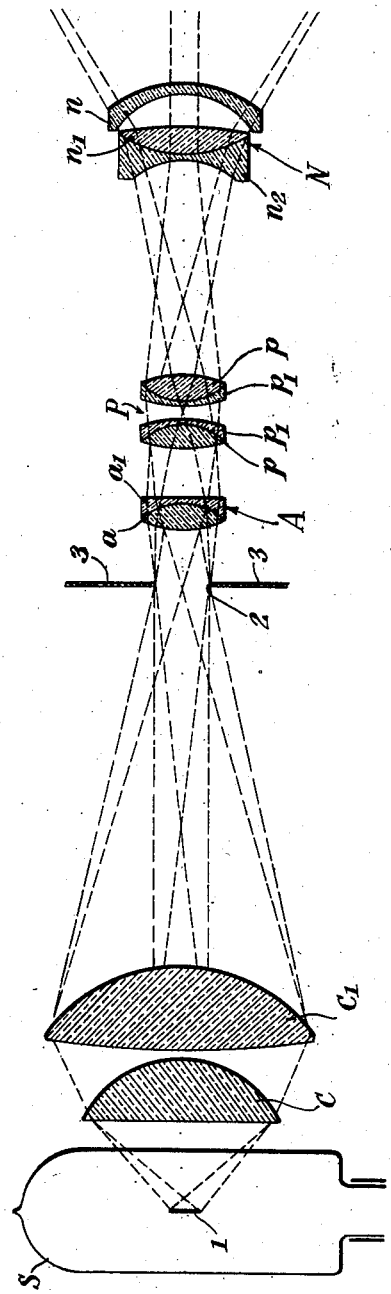
INVENTOR
*Lester W. Bowen*
BY
*Ward, Crosby & Neal*
ATTORNEYS Patented Apr. 2, 1935

1,996,054

UNITED STATES PATENT OFFICE 1,996,054

PROJECTION LENS SYSTEM

Lester W. Bowen, Bronx, N. Y., assignor to Trans-Lux Daylight Picture Screen Corporation, New York, N. Y., a corporation of Delaware Application August 19, 1933, Serial No. 685,895

4 Claims. (Cl. 88—24)

My invention relates to a projection system wherein the projection apparatus and screen are disposed relatively close to each other.

My invention has particular reference to a projection lens system adapted for use in a rear projection system for motion pictures.

Various other objects, advantages and characteristics of my invention will become apparent from the following detailed description.

My invention resides in the projection lens, features and improvements of the character hereinafter described and claimed.

For an understanding of my invention and for an illustration of one of the forms thereof, reference is to be had to the accompanying drawing, in which:

The figure constitutes a diagrammatic representation of a projection system embodying the features of my invention.

In U. S. Letters Patent No. 1,863,099, there is illustrated and described a wide angle projection lens of the type comprising lens assemblies of positive and negative power, respectively, these lens assemblies being associated to produce a projection lens of relatively short equivalent focal length and well adapted, therefore, for purposes of rear projection. By reason of the fact that the described projection lens comprises the specified positive and negative lens assemblies, it is of relatively short equivalent focal length and, therefore, it follows that the back focus is relatively long whereby it becomes necessary to space said projection lens a substantial distance from the picture aperture of the projector mechanism. In a projection system utilizing a light source of small or "point" area, such as an arc source, the condenser system may be so designed as to avoid any substantial loss of light between the projection lens and the picture aperture. However, when the light source has substantial area, as is the case with the filament of a lamp bulb, it results that this greater spaced relation between the projection lens and the picture aperture contributes substantially to the loss or escape of light from the projecting light beam with resultant decrease in efficiency of the system.

With the object of increasing the efficiency of the projecting system, particularly when the light source therefor is of incandescent character, I have developed a projecting lens of the character shown on the accompanying drawing wherein there is associated with the positive and negative assemblies of the wide angle lens an additional lens arrangement which decreases the back focus and effects the passage of additional light through the wide angle lens per se.

Referring to the drawing for an illustration of the invention which may be considered as an improvement on the invention described in the aforesaid Letters Patent, I have shown a suitable source of light S such as a lamp bulb having therein a filament l adapted to be brought to incandescence upon passage of an electric current therethrough. C and Cl represent the lenses of a condenser lens system traversed by a light beam which, beyond the lens Cl, converges in a direction from left to right and passes through an aperture 2 in a plate 3 which represents the aperture plate of any suitable projector, such as a motion picture projector. As is well understood in the art, the motion picture film moves along a path closely adjacent the aperture 2, the sections of said film moving in succession transversely through the projecting light beam as defined in lateral area by the aperture 2.

As stated above, the projection lens of my invention comprises positive and negative lens assemblies in association with an aperture lens assembly having the general function hereinbefore stated. Thus, as shown on the drawing, the projection lens comprises a negative lens assembly N, a positive lens assembly P, and an aperture lens assembly A.

As set forth in the aforesaid Letters Patent, the negative assembly N may be of any suitable character and is herein shown as comprising a single element n of negative power and a doublet spaced therefrom by an air gap, said doublet comprising the cemented-together positive and negative elements nl, n2 which likewise are of negative power. As herein shown, the positive assembly P comprises two doublets spaced apart by an air gap, said doublets, individually and as a combination, being of positive power and each comprising cemented-together positive and negative elements p and pl.

In accordance with the invention, the aperture lens assembly A is of positive character and it may be a single lens arrangement, a doublet, or other plural-lens arrangement. As herein shown, said aperture lens assembly A is a doublet and comprises the cemented-together positive and negative elements a and al.

As shown, the aperture lens assembly A is positioned between the aperture plate 3 and the positive lens assembly P, the exact position to be given thereto being ascertainable by one skilled in the art, and also being determined, to some extent, by the position taken by the image of the filament 1 which usually is brought to a focus at the side of the aperture plate 3 opposite the condensing means. Thus, it has been determined in practice that said aperture lens assembly A may be positioned either within or without the equivalent focal length of the positive lens assembly P. However, depending upon the design of the associated projecting elements, there, ordinarily, is but one position of the aperture lens assembly A which yields the best results and, as stated, such position may readily be determined by one skilled in the art.

With an arrangement of the character shown on the drawing, the aperture lens assembly A is so positioned that it is traversed by substantially all of the light rays which pass through the aperture 2 of the plate 3. The aperture lens assembly A is of positive power and, therefore, it serves to so converge the projecting light beam or restrict the lateral or transverse dimensions thereof that substantially all of the rays which traverse the aperture lens assembly A also traverse the positive lens assembly P. It results, therefore, that the use of the aperture lens assembly A renders the projecting system more efficient because insuring the passage of a substantially greater quantity of light to the screen than would be the case if said aperture lens assembly were not utilized.

The projection lens of my invention may be corrected in any suitable manner for the various aberrations and inaccuracies to which lenses are subject. Thus, the positive lens assembly P and the aperture lens assembly A, considered as a combined unit, may be corrected with respect to the negative lens assembly N in the manner described in the aforesaid Letters Patent No. 1,863,099. Or, the positive lens assembly P and the negative lens assembly N may be partially corrected with respect to each other in such manner that the partially corrected aperture lens assembly A, when associated therewith, causes the complete wide angle lens system to be one which is fully corrected.

The projection system illustrated on the drawings is drawn approximately to half scale and illustrates one practical arrangement for use with standard 35 mm. motion picture film, in which case, the aperture 2 of the plate 3 would be of standard dimensions for such film as well understood in the art. The section through the projection system shown on the drawing is taken diagonally and, hence, the apparently vertical dimension of the aperture 2 is representative, approximately, of the diagonal distance, half-scale, across said aperture. In the form of the invention shown, the element $n$ of the negative lens assembly N has a focal length of $-160$ mm., and the focal length of the combination $n2$, $n1$ is $-202$ mm. The focal length of each combination $p$, $p1$ of the positive lens assembly P is $+70$ mm. and, accordingly, the equivalent focal length of the positive lens assembly is $+40$ mm. The focal length of the aperture lens assembly is $+96$ mm. Where the equivalent focal length of the projection lens inclusive of the positive, negative and aperture lens assemblies is to be approximately $+21$ mm., the skilled lens designer, with the foregoing information before him, may readily compute the spacing between the elements together with the curvature of said elements as required for the production of a fully corrected projection lens combination. It shall be distinctly understood, however, that my invention is not to be limited in the respects noted, nor to the use of 35 mm. film, since the data given is typical of but one of a great number of lens arrangements which may be adopted.

In this specification and in the appended claims, the term "assembly" qualified by either of the words "positive" or "negative", as the case may be, shall be understood as generically comprehending a single lens, a single doublet or other plural lens arrangement, a plurality of doublets or a plurality of other plural lens arrangements, a plurality of single lenses, or a combination consisting of a single lens and a doublet or other plural lens arrangement. It shall also be understood that the term "assemblies" shall have a corresponding meaning.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A wide angle lens projection system adapted to be used with the picture aperture of a projector mechanism, said wide angle lens system comprising a positive lens assembly and a negative lens assembly spaced one from the other a distance greater than the focal length of the positive lens assembly and with the latter positioned nearer said picture aperture, and an aperture lens assembly positioned between said positive lens assembly and said picture aperture and serving to so restrict the lateral dimensions of the projecting light beam that substantially all of the light passing through said aperture lens assembly is likewise passed through said positive lens assembly.

2. In a projection system, the combination with a source of light comprising an incandescent filament, and means for condensing light from said source into a beam for passage through the picture aperture of said mechanism, of a wide angle lens projection system comprising a positive lens assembly and a negative lens assembly spaced one from the other a distance greater than the focal length of the positive lens assembly and with the latter positioned nearer said picture aperture, and an aperture lens assembly positioned between said positive lens assembly and said picture aperture and serving to so restrict the lateral dimensions of the projecting light beam that substantially all of the light passing through said aperture lens assembly is likewise passed through said positive lens assembly.

3. In a projection system, the combination with a source of light comprising an incandescent filament, and means for condensing light from said source into a beam for passage through the picture aperture of said mechanism, of a wide angle lens projection system comprising a positive lens assembly and a negative lens assembly spaced one from the other a distance greater than the focal length of the positive lens assembly and with the latter positioned nearer said picture aperture, said condensing means forming an image of said filament on the side of said picture aperture opposite said condensing means, and an aperture lens assembly positioned between said positive lens assembly and said picture aperture and serving to so restrict the lateral dimensions of the projecting light beam that substantially all of the light passing through said aperture lens assembly is likewise passed through said positive lens assembly.

4. In a projection system, the combination with a source of light comprising an incandescent filament, and means for condensing light from said source into a beam for passage through the picture aperture of said mechanism, of a wide angle lens projection system comprising a positive lens assembly and a negative lens assembly spaced one from the other a distance greater than the focal length of the positive lens assembly and with the latter positioned nearer said picture aperture, said condensing means forming an image of said filament on the side of said picture aperture opposite said condensing means, and an aperture lens assembly positioned between said positive lens assembly and said picture aperture and serving to so restrict the lateral dimensions of the projecting light beam that substantially all of the light passing through said aperture lens assembly is likewise passed through said positive lens assembly, said aperture lens assembly being corrected with respect to said negative lens assembly.

LESTER W. BOWEN.